US010525548B2

(12) United States Patent
Mast et al.

(10) Patent No.: US 10,525,548 B2
(45) Date of Patent: Jan. 7, 2020

(54) FRICTION WELDING METHOD

(71) Applicant: General Electric Company, Schenectady, NY (US)

(72) Inventors: Jonathan D. Mast, Lebanon, OH (US); John R. Kelley, Loveland, OH (US); Timothy J. Trapp, Wyoming, OH (US); Mark K. McCullough, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/655,131

(22) Filed: Jul. 20, 2017

(65) Prior Publication Data

US 2019/0022789 A1 Jan. 24, 2019

(51) Int. Cl.
*B23K 20/00* (2006.01)
*B23K 20/12* (2006.01)
*B23K 20/22* (2006.01)
*B23K 20/26* (2006.01)
*B23K 101/00* (2006.01)

(52) U.S. Cl.
CPC .......... *B23K 20/1205* (2013.01); *B23K 20/22* (2013.01); *B23K 20/26* (2013.01); *B23K 2101/001* (2018.08)

(58) Field of Classification Search
CPC .......... B23K 20/1205; B23K 2201/001; B23K 20/12
See application file for complete search history.

(56) References Cited

U.S. PATENT DOCUMENTS

| 5,248,077 | A | * | 9/1993 | Rhoades | B23K 20/1205 |
| | | | | | 228/112.1 |
| 5,551,623 | A | | 9/1996 | Collot et al. | |
| 5,699,952 | A | | 12/1997 | Fix, Jr. | |
| 5,813,593 | A | | 9/1998 | Galaske, Jr. | |
| 5,941,537 | A | | 8/1999 | Wallace et al. | |
| 6,478,545 | B2 | | 11/2002 | Crall et al. | |
| 7,334,332 | B2 | | 2/2008 | Ferte et al. | |
| 7,770,777 | B2 | | 8/2010 | Miller et al. | |
| 8,070,039 | B1 | * | 12/2011 | Johnson | B23K 20/1205 |
| | | | | | 228/2.1 |
| 8,323,427 | B1 | | 12/2012 | Slattery et al. | |
| 8,613,138 | B2 | | 12/2013 | Chin et al. | |
| 9,194,245 | B2 | | 11/2015 | Wlasowski | |

(Continued)

FOREIGN PATENT DOCUMENTS

EP 1 996 365 A1 12/2008

OTHER PUBLICATIONS

Extended European Search Report and Opinion issued in connection with corresponding EP Application No. 18182080.4 dated Dec. 20, 2018.

*Primary Examiner* — Erin B Saad
(74) *Attorney, Agent, or Firm* — General Electric; Kristi Davidson

(57) ABSTRACT

A friction welding method includes: applying axial force to first and second metallic components so as to force the components against each other at an interface therebetween, while oscillating the two components relative to each other in a cyclic motion, so as to generate friction and heat at the interface; rapidly stopping the cyclic motion; and applying a spike in the axial force to complete a weld between the first and second components.

19 Claims, 3 Drawing Sheets

(56) References Cited

U.S. PATENT DOCUMENTS

| | | | |
|---|---|---|---|
| 2006/0237160 A1* | 10/2006 | Nitta | B22D 11/055 164/418 |
| 2007/0140853 A1* | 6/2007 | McCann | C23C 4/04 416/193 A |
| 2009/0314823 A1 | 12/2009 | Bray | |
| 2010/0040900 A1* | 2/2010 | Sumi | B23K 20/121 428/586 |
| 2016/0312653 A1 | 10/2016 | DiDomizio et al. | |

* cited by examiner

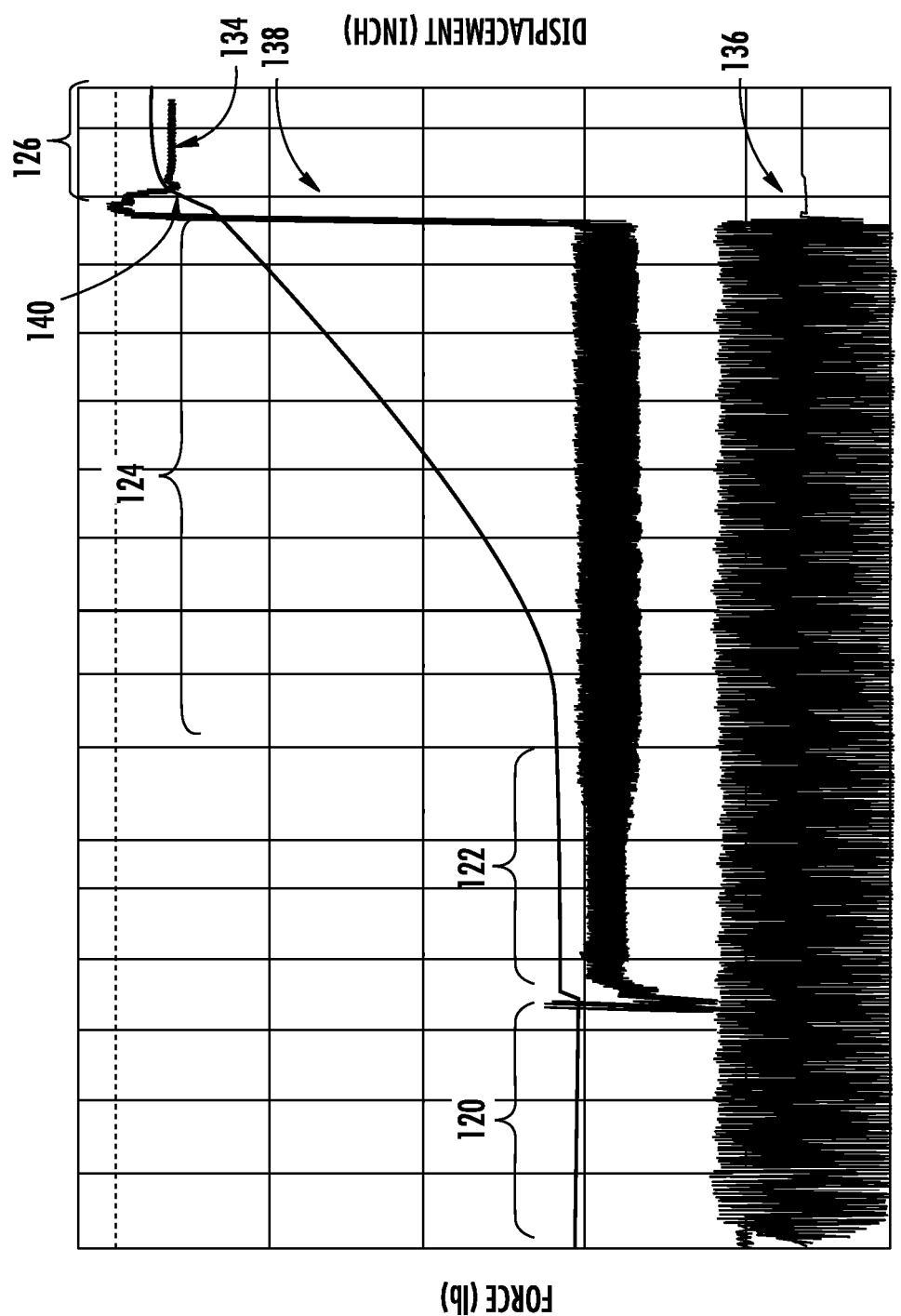

FRICTION WELDING METHOD

BACKGROUND OF THE INVENTION

This invention relates generally to welding, and more particularly to methods for friction welding.

Friction welding of components such as gas turbine engine blades to rotors is known in the manufacture or repair of an integrally bladed disk, sometimes known as a BLISK. An integrally bladed disk is a disk or wheel on the periphery of which there is attached or carried a multiplicity of blades forming a monolithic structure or component. This same technique may also be used to attach a blade to a multi-stage monolithic drum rotor of a gas turbine engine. In a conventional rotor assembly, the blades are attached to a disk or wheel by interlocking dovetail attachment methods. In integrally bladed disks and drums the blades are either formed and machined integrally with the disk or drum or are welded or otherwise bonded thereto. The components to be bonded together are linearly or translationally rubbed one against the other with a reciprocating translational motion so that at their interface sufficient heat is generated by friction to effect the weld. Then, an axial welding force is applied to urge the components with a steady force to promote a better weld.

In the prior art, friction welding machine controls are tuned to prevent the weld from under or overshooting desired set points during conditioning, burn off, and forge phases of operation. While this tuning provides a uniform upset rate and predictable total upset during a weld, it can also restrict rate of application and amount of forge axial force. As a result, the horizontal displacement rate and compressive forces exerted by the machine can be reduced.

While prior art methods of friction welding work well when the same types of materials are used, testing has shown that some combinations of dissimilar alloys are prone to defects if insufficient displacement rate and/or compressive force are not applied when the oscillator movement is discontinued during the forge phase of the weld. Testing has also shown that frequency and amplitude of the oscillator during the conditioning and burn off phases, and the rate of oscillator decay during the forge phase, can impact upset rate during the forge phase, which can impact weld quality.

BRIEF DESCRIPTION OF THE INVENTION

This problem is addressed by a friction welding method using rapid oscillation decay coupled with a spike in axial force to enable bi-alloy welds.

According to one aspect of the technology described herein, a friction welding method includes: applying axial force to first and second metallic components so as to force the components against each other at an interface therebetween, while oscillating the two components relative to each other in a cyclic motion, so as to generate friction and heat at the interface; rapidly stopping the cyclic motion; and applying a spike in the axial force to complete a weld between the first and second components.

According to another aspect of the technology described herein, a method of friction welding a blade to a rotor includes: applying axial force to press an airfoil stub of the blade against a rotor stub of the rotor at an interface therebetween; oscillating the blade in a cyclic motion relative to the rotor stub to generate friction and heat at the interface; and rapidly stopping the oscillation and applying a spike in axial force to complete a weld between the blade and the rotor.

BRIEF DESCRIPTION OF THE DRAWINGS

The invention may be best understood by reference to the following description taken in conjunction with the accompanying drawing figures in which:

FIG. 3 is a chart illustrating a friction welding method conducted in accordance with an aspect of the present invention.

DETAILED DESCRIPTION OF THE INVENTION

The present invention may be used for any irrotational movement for friction welding which may take either of two forms. It may be linear in which case the component is caused to undergo a substantially linear or translational reciprocating motion during the friction heating phase, or it may be an orbital movement in which the moving component follows a closed loop path.

Figure 1:
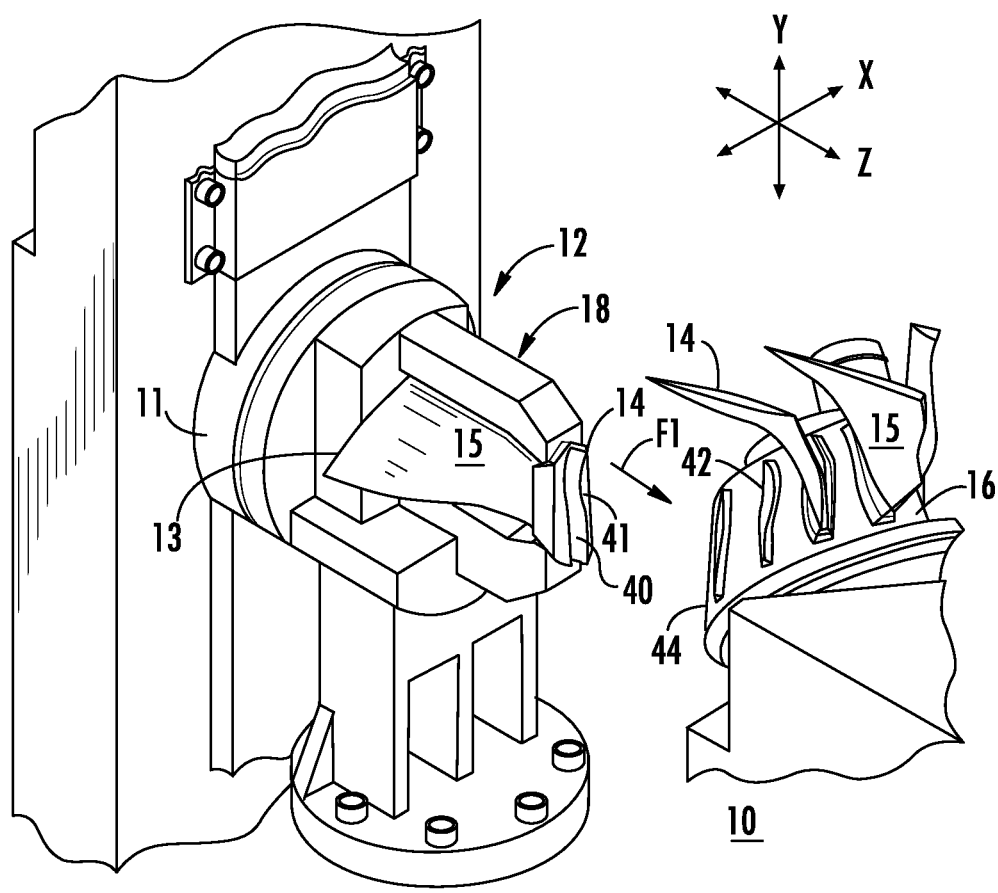
FIG. 1 is a perspective view illustrating a part of a prior art friction bonding machine including an apparatus for friction welding of a gas turbine engine blade component to a gas turbine engine rotor component.

Referring now to the drawings in detail wherein identical numerals indicate the same elements throughout the various views, FIG. 1 illustrates a part of a prior art friction bonding machine 10 as described in U.S. Pat. No. 5,813,593, the disclosure of which is herein incorporated by reference. The machine 10 has a headstock 11. The headstock 11 has mounted to it an apparatus 12 for friction welding of a first component exemplified by a gas turbine engine blade 14 to a second component exemplified by a gas turbine engine rotor 16 in accordance with an exemplary embodiment of the present invention. The blade 14 has an airfoil 15 extending longitudinally between an airfoil tip 13 and an airfoil stub 40 and extending transversely between a leading edge and a trailing edge. The airfoil stub 40 has a flat welding surface 41 at its bottom. The apparatus 12 includes a holder 18 to hold the blade 14. Axial force is applied to the blade 14 through the holder 18 in a first direction F1 to press the airfoil stub 40 of the blade 14 into contact with a rotor stub 42 on a periphery 44 of the rotor 16. Friction welding involves oscillating motion of the blade 14 and airfoil stub 40.

It will be understood that the apparatus shown in FIG. 1 is merely one example of a suitable friction bonding apparatus. The present invention includes methods for using a friction bonding apparatus for friction welding of the blade 14 to the rotor stub 42.

Figure 2:
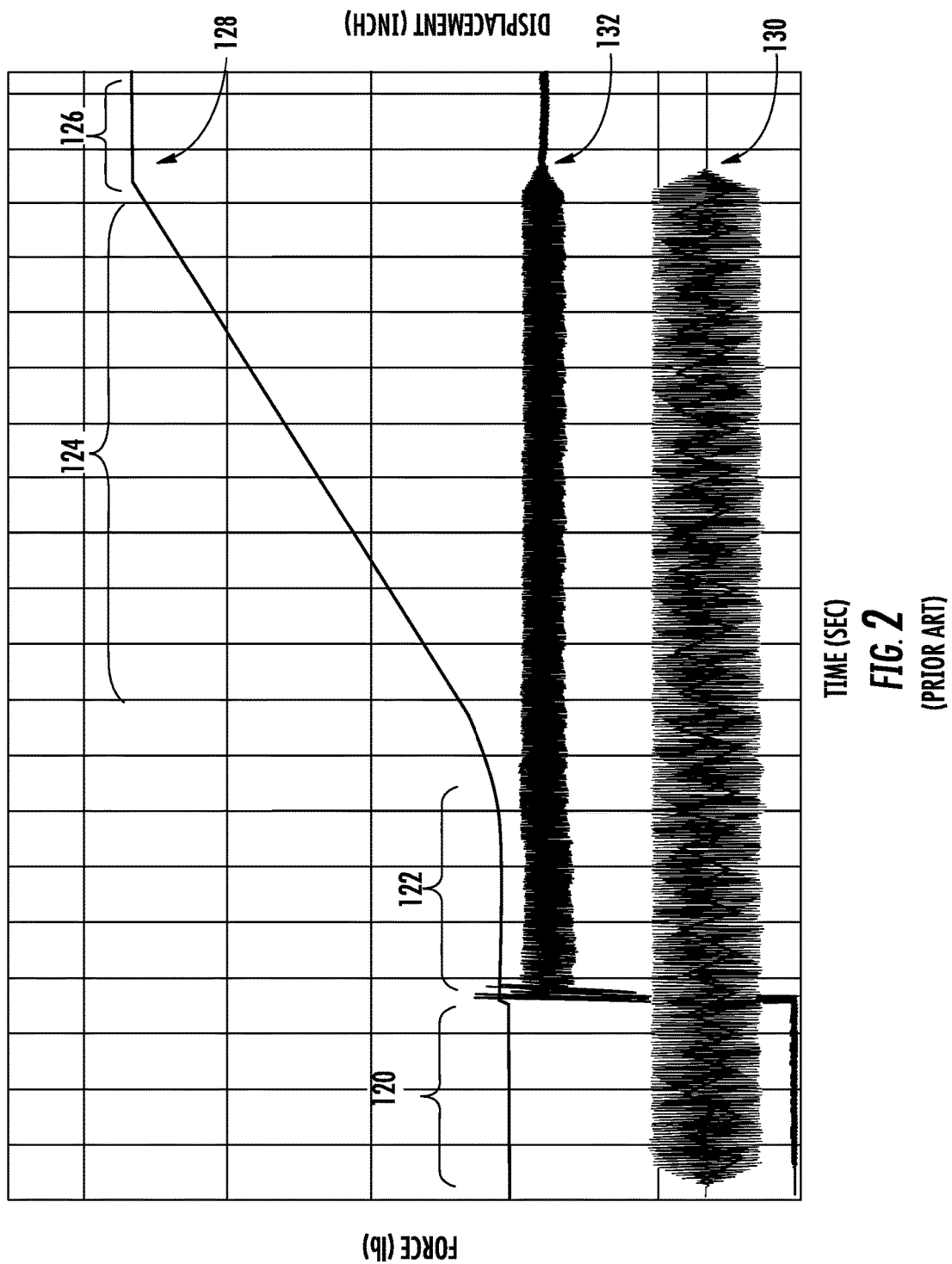
FIG. 2 is a chart illustrating a prior art friction welding method.

The friction welding process involves pressing two components together in an axial direction with axial force F1 and then oscillating the two components relative to each other to generate friction and heat. There are four distinct phases: a contact phase 120, a conditioning phase 122, a burn-off phase 124, and a forge phase 126. FIG. 2 illustrates a prior art version of this process. During the forge phase 126, the material actually "upsets" 128, that is flows outward from the joint while the two parts come closer together in an axial direction.

Generally, the process operates by oscillating to generate the heat while applying the axial force, then stopping the oscillation with the part in the correct position and continuing to apply the axial force while the forge phase occurs. As the part cools, the weld transforms from a plastic phase back to a solid phase. The excess material extruded from the joint is then machined away.

In the prior art, during the forge phase 126, the process ends by oscillating over a relatively long period of time 130, for example, about 7 to 8 oscillation cycles while the axial force is held constant 132 (see cone shape formed when oscillation ends and nominally constant force profile). In other words, all input parameters are tightly controlled with feedback loops and the axial force applied is the same from start to finish.

Unfortunately, it has been found that defects can occur using the prior art method. Such defects may be more prevalent when welding together dissimilar alloys such as Ti-6-4 and Ti-17 due to dissimilar alloys having different properties.

As shown in FIG. 3, the method of the present invention uses a "spike forge upset" 134 which has been found to limit the defects associated with prior art methods. As used herein, "spike forge upset" is defined as a rapid upsetting in the weld area near the end of the weld cycle. Unlike prior art methods, FIG. 2, which end oscillation over a relatively long period and hold the axial force constant, the method of the present invention stops oscillation very rapidly 136, for example, in one cycle or less (see the squared-off oscillation signal). During the forge phase 126, a spike 138 (see dramatic increase in amplitude of the force signal) is applied in the axial force, simultaneously or near-simultaneously with stopping the oscillation. The spike may include any additional axial force above the baseline axial force. In one example, the peak axial force may be spiked to a magnitude at least about 1.5 times the baseline axial force. In another example, the peak axial force may be spiked to a magnitude at least about two times the baseline axial force. In another example, the peak axial force may be spiked to a magnitude at least about five times the baseline axial force. As used herein, a "spike" refers generally to a rapid increase in the axial force. In one example, the axial force may be raised (i.e. "spiked") from the baseline level to the peak in less than about 0.2 seconds. In another example, the axial force may be spiked from the baseline level to the peak in less than about 0.05 seconds. As shown in FIG. 3, this results in a significant amount of additional material displacement or upset occurring 140 at the very end of the process, in response to the axial force spike. In one example, approximately 15% of the total upset can occur during the spike.

According to one aspect, the method of the present invention adjusts oscillator frequency and amplitude, and axial force parameters to allow frictional heat generated during the conditioning phase 122 and adiabatic heat generated during the burn off phase 124 to soak back into the airfoil and rotor stubs 40, 42 to preheat these areas prior to the forge phase 126. This preheating helps promote more rapid axial material flow when the force is increased during the forge phase 126. The other parameters that impact spike forge include forge force, forge ramp time, and oscillator ramp time, which all occur during the forge phase of the weld.

In addition to setting these parameters, the machine 10 needs to be capable of supplying and maintaining a sufficiently high forge force in a very rapid manner. This is because much of the pre-heat generated by the oscillator movement soaks away rapidly as the oscillation is stopped at the end of the weld. The spike forge effect is enhanced by simultaneous or near-simultaneous rapid decay of the oscillation and application of forging force. Generally, "rapid decay" as used herein refers to stopping the oscillation in a short enough time period that a significant amount of heat does not soak away before the forge force is spiked. In one example, the oscillation may be stopped in less than about 0.2 seconds. This corresponds to less than 8 cycles where the oscillation frequency is 40 Hz. In another example, the oscillation may be stopped in less than about 0.025 seconds. This corresponds to less than one cycle where the oscillation frequency is 40 Hz. In another example, the oscillation may be stopped in less than about 0.0125 seconds. This corresponds to less than one-half cycle where the oscillation frequency is 40 Hz.

Because the machine's moving details are typically massive and slow to react to the oscillation and axial loads during welding, it can be difficult to accelerate this much mass during the spike forge. However, rapid movement can be achieved by detuning of the pressure system and minimizing moving mass of the tooling. By adjusting the control feedback system to allow the force to initially overshoot the target forge force, rapid weld upsetting can be accomplished.

By intentionally de-tuning the response of the axial force feedback control, a much faster spike forging event can occur as the weld oscillator is simultaneously discontinued. This de-tuning causes axial force to intentionally overshoot the forge force set-point to produce a much faster axial follow-up during the weld. This rapid axial movement creates more rapid compression in the thermo-mechanically affected zone, and heat affected zones of the weld causing an unusually large amount of weld upset. The spike forge process creates an upset increase 140 of three to four times compared to prior art methods.

Unlike prior art methods, the spike may be uncontrolled or open loop, in the sense that the axial force is simply increased to the maximum the machine 10 is capable of providing, without attempting to control. The upset is determined by the dynamics of the two parts, the weld preparation, the alloys, etc. The spike is helped by taking advantage of the momentum in the machine 10 (i.e., an axial force is already being applied and the force is rapidly increased as the oscillation is stopped). The method is highly repeatable. It is generally necessary to add additional material to the parts to accommodate the additional deflection/upset.

The method described herein has several advantages over the prior art. In particular, it provides the ability to produce defect-free bi-alloy welds using friction welding. Thus, allowing the use of materials specifically suited for a particular part to optimize performance and weight.

The foregoing has described an apparatus and method for friction welding. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A friction welding method, comprising:
applying axial force to first and second metallic components so as to force the components against each other at an interface therebetween, while oscillating the two components relative to each other in a cyclic motion, so as to generate friction and heat at the interface;
stopping the cyclic motion in one cycle or less; and
applying a spike in the axial force to raise the axial force from a baseline axial force to an uncontrolled peak axial force, the peak axial force being greater than a pre-determined forge force to provide rapid weld upsetting, the step further including reducing the axial force to the forge force to complete a weld between the first and second components, the application of the spike in the axial force beginning simultaneously with the cyclic motion coming to a stop.

2. The method according to claim 1, wherein the cyclic motion is stopped in less than 0.2 seconds.

3. The method according to claim 1, wherein the cyclic motion is stopped in less than 0.025 seconds.

4. The method according to claim 1, wherein the cyclic motion is stopped in less than 0.0125 seconds.

5. The method according to claim 1 wherein the spike in the axial force from the baseline axial force to the peak axial force occurs in less than about 0.2 seconds.

6. The method according to claim 1, wherein the spike in the axial force is applied in an open loop without feedback control.

7. The method according to claim 1, wherein the spike in the axial force has a peak magnitude of at least about 1.5 times an initial value of the axial force.

8. The method according to claim 1, wherein the first component comprises a first metal alloy and the second component comprises second metal alloy different from the first metal alloy.

9. The method according to claim 8, wherein the first alloy is Ti-6-4 and the second alloy is Ti-17.

10. A method of friction welding a blade to a rotor, comprising:
applying axial force to press an airfoil stub of the blade against a rotor stub of the rotor at an interface therebetween;
oscillating the blade in a cyclic motion relative to the rotor stub to generate friction and heat at the interface; and
stopping the oscillation and simultaneously applying a spike in axial force to an uncontrolled peak axial force, the peak axial force being greater than a pre-determined forge force to provide rapid weld upsetting, the step further including reducing the axial force to the forge force to complete a weld between the blade and the rotor as the oscillation comes to a stop.

11. The method according to claim 10, wherein the blade comprises a first metal alloy and the rotor stub comprises a second metal alloy.

12. The method according to claim 11, wherein the blade comprises Ti-6-4 and the rotor comprises Ti-17.

13. The method according to claim 10, wherein the oscillation is stopped in less than about 0.2 seconds.

14. The method according to claim 10, wherein the oscillation is stopped in less than about 0.025 seconds.

15. The method according to claim 10, wherein the oscillation is stopped in less than about 0.0125 seconds.

16. The method according to claim 10, wherein the spike in the axial force causes the axial force to move from an initial value to a peak value in less than about 0.2 seconds.

17. The method according to claim 10, wherein the spike in the axial force causes the axial force to move from an initial value to a peak value in less than about 0.05 seconds.

18. The method according to claim 10, wherein the spike in the axial force is applied in an open loop without feedback control.

19. The method according to claim 10, wherein the spike in the axial force has a peak amplitude of at least about two times an initial value of the axial force.

* * * * *